Dec. 18, 1962  C. E. FRICK  3,069,514
TIMER ACTUATING SWITCH

Filed Sept. 29, 1960  2 Sheets-Sheet 1

INVENTOR.
CHARLES E. FRICK
BY Howard K. Kothe

ATTORNEY

Dec. 18, 1962 C. E. FRICK 3,069,514
TIMER ACTUATING SWITCH
Filed Sept. 29, 1960 2 Sheets-Sheet 2

INVENTOR.
CHARLES E. FRICK
BY Howard K. Kotha
ATTORNEY

United States Patent Office 3,069,514
Patented Dec. 18, 1962

3,069,514
TIMER ACTUATING SWITCH
Charles E. Frick, South Charleston, W. Va., assignor to Union Carbide Corporation, a corporation of New York
Filed Sept. 29, 1960, Ser. No. 59,374
4 Claims. (Cl. 200—34)

The present invention relates to an electrical switching device which sequentially opens a circuit, maintains the circuit open during movement of an operating arm on said switch, closes said circuit and absorbs, without excess pressure on the switch electrical contacts, mechanical force incident to any overtravel of the switch operating arm. More particularly, the present invention relates to an electrical timer actuating switch especially useful in conjunction with positive displacement type viscometer devices.

Viscosity relates broadly to the flow behavior of fluid materials and may be defined as a measure of the force required to shear a fluid at a unit rate. Melt index measurements, flow behavior and other viscosity-related characteristics of various fluid state resins, plastics and synthetic compounds are of great interest and importance to those persons in the chemical and related arts in determination and study of the physical properties of these materials. Consistency is a property related to viscosity or plasticity which is encountered in the case of suspensions and, while suspensions as such do not exhibit true viscosity, the consistency of fluid suspensions can be measured by techniques similar to those used for viscosity measurement. Known methods for measuring viscosity or consistency of fluids include determination of the torque required to rotate an impeller immersed in the fluid, measuring the speed of such an impeller while driving it at constant torque, timing the rise of an air bubble through the fluid, timing the fall of an object through the fluid, measuring the pressure drop across a capillary tube through which the fluid is caused to flow, and, according to the principle employed in most viscometers, timing the flow of a preselected quantity of the fluid extruded through an orifice or short tube, this last method being one to which the apparatus of my invention is particularly applicable.

While several presently available methods and devices are used to determine the properties of fluids under investigation, none, and no combination thereof, gives completely satisfactory results. In general, the presently known techniques and apparatus require one or more manually performed steps such as stop-watch timing of a metered flowing mass or manual cut-off of such a mass from an extrusion orifice of an apparatus. Obviously, methods and apparatus dependent upon manually performed steps are prone to human error and, at the very least, to the aberative effects attendant subjective interpretation of data indicated during test performance.

The apparatus of the present invention, used in conjunction with electrical timing apparatus and commercially available laboratory type orifice flow viscometers, provides for fully automatic measurement of volumetric flow rate of fluid materials and makes available a precise measuring technique free of manually performed steps and possible subjective errors attendant thereon, and having an exceptionally high degree of reproducibility of results and consistent accuracy.

With the foregoing and other features in view, which shall more fully hereinafter appear, the invention comprises novel constructions, combinations and arrangements of components as will now be described in detail and as defined in the appended claims and as illustrated in preferred embodiment in the accompanying drawings, in which:

Figure 1:
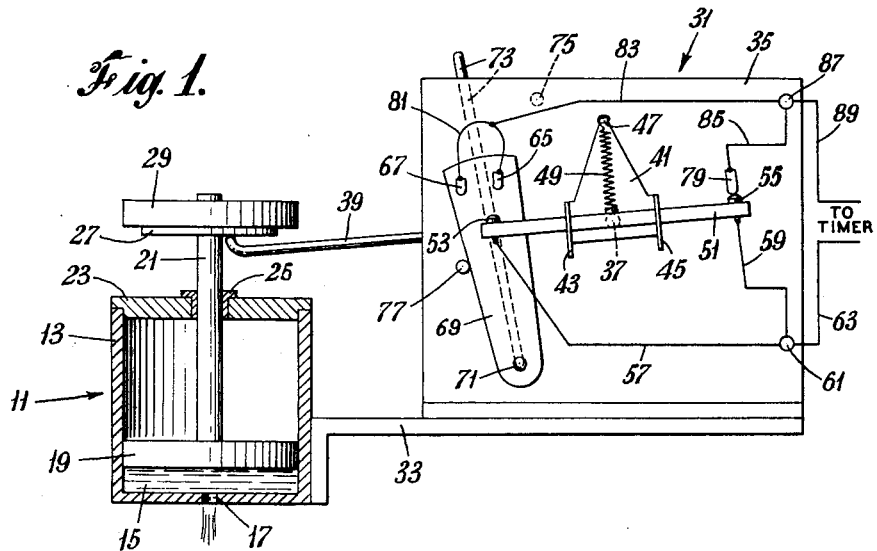
FIGURE 1 is a front view of the timer actuating switch of the present invention in a second closed circuit position, juxtaposed to an orifice type viscometer which is shown sectionally.
Figure 3:
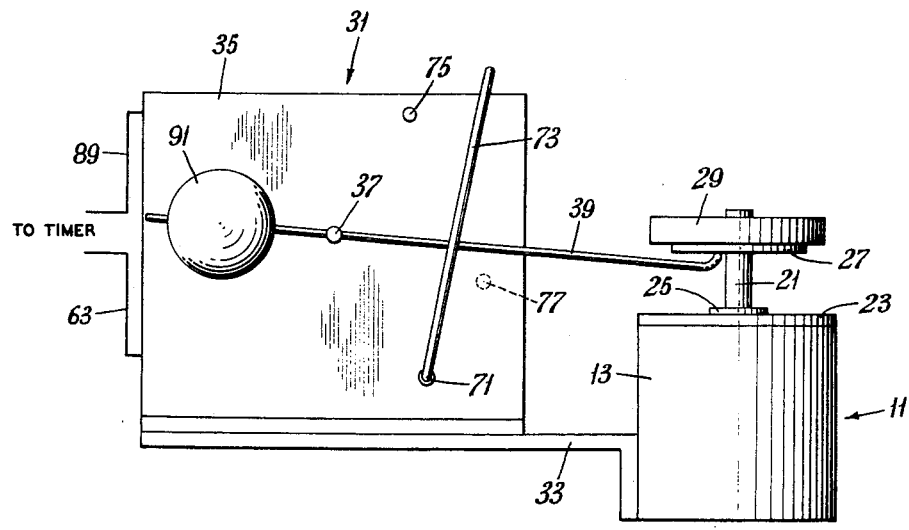
FIGURE 3 is a rear view of the switch of FIGURES 1 and 2.

Referring to the drawings and with particular reference to FIGURES 1 and 3, an orifice type viscometer, indicated generally by the designation 11 is shown having mounted thereon a timer actuating switch assembly indicated generally by the designation 31. Viscometer 11 comprises a sample holding cylinder 13, having a closed bottom with a centrally located extrusion orifice 17, a fluid actuating piston 19 connected to a piston rod 21, a cylinder cover 23 with a centrally located aligning bearing 25 through which passes piston rod 21, a flange 27 permanently attached to piston rod 21 at a point near said rod's upper end and an actuating weight 29 with a centrally located mounting hole adapted to be slipped over the upper end of piston rod 21 and supported by flange 27. Viscometers of this type are widely used in melt index determinations in the plastics and related arts and such devices frequently include heating and temperature control elements to facilitate study of flow behavior. As commonly used, a sample fluid mass 15 which is to be investigated, is deposited in viscometer cylinder 13. The fluid may be heated to flow viscosity prior to placement in the cylinder but usually is heated in place in the cylinder by integral heating element at the time flow measurements are about to start. When the fluid mass 15 is heated to a predetermined temperature at which flow will occur, the assembly comprising piston 19, piston rod 21, flange 27, aligning bearing 25 and cylinder cover 23 is placed in cylinder 13 with the piston lower face in contact with the fluid mass surface. Flow measurement is commenced by placing actuating weight 29 on the rod 21 and flange 27, thereby loading piston 19 which exerts pressure on the fluid mass, extruding it through orifice 17. During the downward movement of the piston, the time required for the moving assembly to travel between two selected points along the travel path is measured and used as a flow index of the material under investigation, at the particular temperature chosen. My invention, as will be seen from the ensuing description, enhances and refines the above-described basic technique by performing this timing operation in a fully automatic manner.

Figure 2:
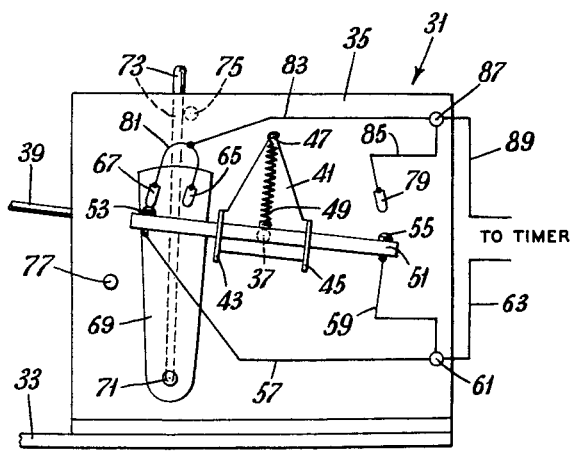
FIGURE 2 is a front view of the timer actuating switch of the present invention in one of two selectable first closed circuit positions.
Figure 4:
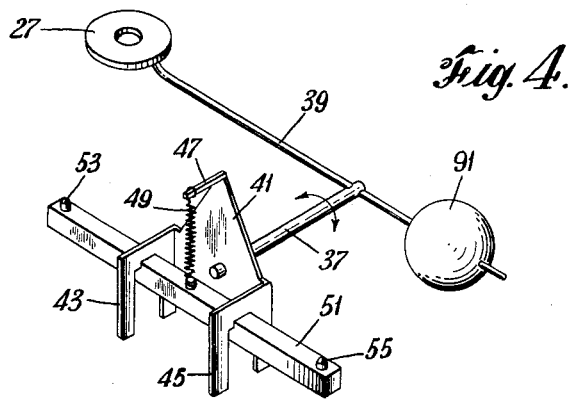
FIGURE 4 is a free body isometric presentation of the moving components of the switch.

A switch assembly support bracket 33 is affixed to a sidewall of viscometer 11 to support switch assembly 31 and to maintain said assembly in correct relative position with respect to the moving parts of the viscometer. Switch frame 35 is secured to support bracket 33 and serves as both a mount for the movable portions of the switch and as a terminal base for the switch electrical circuitry. Those familiar with the electrical device art will appreciate that the switch frame may be made from either electrically conductive or electrically nonconductive material and if made from electrically conductive material, may be used in the switch circuitry in lieu of certain of the conductors to which reference is hereinafter made, provided proper insulating components are furnished to prevent grounds and short circuits. In order, however, more clearly to illustrate the electrical circuitry of the switch, the switch frame will be described as made from an electrically non-conductive material, such as plastic or ceramic. Although, as shown in the drawings, switch frame 35 is an upright rectangle, the frame may be any shape, as long as sufficient thickness is provided to prevent side play of rotating spindles passing transversely through the frame, and the frame sides are substantially flat and parallel to each other. A spindle 37, having one end firmly attached to switch operating arm 39, as shown in FIGURES 3 and 4 of the drawings, is positioned to rotate freely in a hole passing transversely through switch frame 35. To the other end of spindle 37, and as shown in FIGURES 1, 2 and 4 of the drawings, a force limiter 41 is rigidly affixed. Force limiter 41 comprises, in addition to the base portion which is attached to spindle 37, two inverted U-shaped yokes 43 and 45 and a spring anchor pin 47 which project outwardly towards the observer in FIGURES 1 and 2 of the drawings, normal to the plane of said base portion, and a coil spring 49. Force limiter 41 and its component yokes and spring anchor pin may be formed to shape from a unitary metal stamping or may be built up integrally. The assembly comprising switch operating arm 39, spindle 37 and force limiter 41 rotates in place in switch frame 35 as a single unit, as may be seen in FIGURE 4 of the drawings. A contact bar 51 is shown arranged in the yokes 43 and 45 of force limiter 41, held in place by the tensile force of coil spring 49, which is lightly tensioned and attached at its respective ends to spring anchor pin 47 and the midpoint of the contact bar. Small traverse grooves are cut into the contact bar upper surface at the respective points of bearing on yokes 43 and 45 to prevent longitudinal slipping of the contact bar through the yokes. To insure accurate pivotal movement of contact bar 51 with respect to force limiter 41, which movement will be described in greater detail hereinafter, the transverse groove in the contact bar at its bearing point on yoke 43 is V shaped and the bearing point portion of yoke 43 is rounded to engage the V shaped groove with minimum friction. The side portions of the inverted U-shaped yokes 43 and 45 prevent sideplay of contact bar 51 and assure its monoplanar movement about an axis congruent with the rotational axis of spindle 37. A first electrical contact point 53 and a second electrical contact point 55 are fixed, respectively, to the ends of contact bar 51, having contact faces disposed upwardly. Contact points 53 and 55 are electrically connected by conductors 57 and 59, respectively, to a common terminal point 61 which is located in an accessible position on switch frame 35 and adapted for connection of an external circuit conductor 63. This portion of the switch circuitry is shown schematically for clearness of understanding. In the preferred embodiment of the apparatus of my invention, however, conductors 57 and 59 are equal in length and run respectively from contact point 53 and contact point 55 to a junction with a third conductor which connects the junction to terminal point 61. The third conductor is of very flexible wire. This arrangement effectively eliminates drag on the switch operating mechanism.

Arranged in juxtaposition to electrical contact point 53 are third electrical contact point 65 and fourth electrical contact point 67, mounted on a pivotally movable assembly comprising a toggle plate 69, a shaft 71 and an operating lever 73. Shaft 71 passes transversely through a hole through switch frame 35. Attached to one end of shaft 71, operating lever 73 extends upwardly to a point above the switch frame making said lever accessible for manipulation. Toggle plate 69, with the third and fourth contact points mounted thereon, is affixed to the other end of shaft 71 and moves in correspondence with operating lever 73, pivotally on shaft 71, between two limiting positions fixed by a first stop pin 75 and a second stop pin 77, said stop pins being fixed to switch frame 35 and projecting outwardly therefrom towards the observer as shown in FIGURES 1 and 3 of the drawings. With the toggle plate assembly in position against stop pin 75, first contact point 53 is in register with fourth contact point 67. With the toggle plate assembly in position against stop pin 77, first contact point 53 is in register with third contact point 65.

Juxtaposed to and in registering position with second electrical contact point 55 is fifth electrical contact point 79, which is mounted on switch frame 35. Third contact point 65, fourth contact point 67 and fifth contact point 79 are electrically connected, by conductors 81, 83 and 85, respectively, to common terminal point 87, which, like terminal point 61, is located in an accessible position on switch frame 35 and adapted for connection of an external circuit conductor 89. Here it should be noted that, while electrical contact points 65 and 67 are adapted to be maintained in fixed positions on toggle plate 69 and contact point 79 is adapted to be maintained in fixed position on switch frame 35 during normal use of the switch, provision is made for adjusting the positions of these contact points for calibration of the switch.

From the foregoing description and from FIGURE 4 of the drawings, it will be obvious that contact bar 51, held in position in the yokes 43 and 45 of force limiter 41 by spring 49, moves monoclinally with actuating arm 39 about an axis through the length of spindle 37, and between two limiting positions, one of which is selectable, determined by the electrical contact points mounted on toggle plate 69 and on switch frame 35. It should be noted that contact points 65 and 67 are arranged with a vertical offset with respect to each other. This feature yields selectable travel lengths for the moving parts of the switch and makes my invention applicable to wider measurement ranges than would otherwise be possible. Those skilled in the art will appreciate that, while, in the embodiment shown in the drawings, only two selectable contact points, viz. 65 and 67, are shown, any number of such contact points, within practical physical limitations, can be used. In this respect, the toggle plate assembly could be replaced by a larger segmental arc plate, bearing a multiplicity of vertically offset contact points selectably registerable with contact point 53 by means of a detent assembly. It has been found, however, that for the purpose of melt index measurements of plastics, resins and the like and other investigations required in the chemical and plastics art, the two position toggle plate arrangement of the embodiment shown in the drawings provides for sufficiently diverse applicability of my invention.

To complete switch assembly 39, a counterweight 91, bored to fit slideably over the short moment arm end of actuating arm 39, is positioned on said arm to effect contact between electrical contact point 53 and, depending on the position of the toggle plate assembly, either of the contact points 65 or 67. In order to simplify the ensuing discussion of this portion of the description of my invention, let it be assumed that toggle plate 69 is in position against stop pin 75, bringing electrical contact point 67 into registering position with electrical contact point 53.

The embodiment of my invention shown in the drawings operates successfully in plastic materials melt index determinations, in conjunction with a viscometer and with an electrically controlled laboratory type timing apparatus actuated by a suitable relay which is connected in circuit with the switch external conductors 63 and 89. In this application, the viscometer 11, includes heating elements and temperature control devices. The sample fluid mass 15 to be tested is placed in the viscometer cylinder, the piston assembly, comprising the piston, piston rod, flange, aligning bearing and cylinder cover is put in place and the sample is heated to and maintained at a predetermined test temperature. Before actuating weight 29 is positioned on the flange 27 and piston rod 21, switch counterweight 91 is adjusted on actuating arm 39 to effect contact between contact points 53 and 67. This step is normally performed as a calibration procedure. In this condition the long moment arm end of actuating arm 39 is in a position with its upturned end just under flange 27, out of engagement therewith, by a distance in the order of one inch, and electrical continuity is established between external circuit conductors 63 and 89 through the switch circuitry and contact points 53 and 67.

The test is started by placing actuating weight 29 over the top of piston rod 21 onto flange 27, transmitting force to piston 19 which acts on the fluid 15, displacing said fluid through orifice 17. As extrusion of the sample commences, the assembly comprising piston 19, piston rod 21, flange 27 and actuating weight 29, moves downwardly at a steady rate dependent, for a particular viscometer apparatus, upon the temperature and viscosity of the sample fluid. Shortly after commencement of this downward movement at a time when a steady extrusion rate is attained, flange 27 engages the long moment end of switch actuating arm 39 causing pivotal movement of said arm, spindle 37, force limiter 41 and contact bar 51 about the spindle axis. The electrical contact between contact points 53 and 67 is broken, opening the circuit between external conductors 63 and 89. The electrical circuitry and relay arrangement external of switch 31 is such that the timing device is started when the switch circuit is opened and stops when it is closed. As the moving assembly of the viscometer continues its downward movement, contact point 55 on contact arm 51 comes to rest against contact point 79, reestablishing electrical continuity through the switch circuitry and stopping the timer. The elapsed time indicated on the timer is a function of the viscosity of the sample tested. Extrusion may continue after contact point 55 comes to rest against contact point 79, causing further depression of switch actuating arm 39, and it is at such time that force limiter 41 and related components come into play.

The actuating switch of the present invention is, of necessity, a sensitive instrument having relatively delicate component parts incapable of withstanding extraordinary stresses. Contact point wear and minor distortion of moving parts which would have only negligible effect on an ordinary switching device, could cause undesirable read-out aberations in an instrument of this type. The force limiting components of the switch, by resiliently absorbing the overtravel of the switch operating arm 39, prevent undue loading of the switch parts. As the operating arm, spindle and force limiter continue pivotal movement after contact point 55 engages contact point 79, arresting the movement of contact bar 51, force limiter yoke 45 lifts from contact bar 51, with the bearing point of yoke 43 on the contact bar assuming the function of a fulcrum for relative pivotal movement of the force limiter 41 with respect to the contact bar. The consequent additional tensioning of spring 41 is sufficient to restore operating arm 39, through force limiter 41 and spindle 37 to a monoclinal position with respect to contact bar 51 when actuating weight 29 is removed from the viscometer and the viscometer piston assembly is raised. Coincidently with such a restoration, counterweight 91 will effect a return of the switch mechanism to its initial condition with contact points 53 and 67 in contact and the switch in readiness for the next measurement. The force limiting components of the switch also prevent overloading of the switch moveable parts due to force applied upwardly to the underside of the long moment end of switch operating arm 39 when the switch is in first closed contact position. Application of such a force causes force limiter yoke 43 to lift from contact bar 51 and the bearing point of yoke 45 assumes the function of a fulcrum for the relative pivotal movement of the force limiter with respect to the contact bar. In order to assure accurate actuating motion of switch operating arm 39 by viscometer flange 27, it is important that the underside of the flange be smooth and at an angle of exactly 90° all around with respect to the peripheral surface of piston rod 21. The necessity for this will be obvious from the fact that there is relative sliding motion of the upturned end of the operating arm 39 on the underside of flange 27 during operation.

While, in the foregoing description, the operation of the apparatus of my invention has been described in conjunction with a flow measurement method and apparatus, it will be apparent to persons skilled in the art that it will function equally well in many varieties of time delay relay schemes or as a limit switch for controlling short precision movements such as occur in cutting machine operations.

From the foregoing description it will be readily appreciated that the apparatus of my invention provides a simple precise switching device applicable to a wide variety of measurement and control techniques and is a valuable contribution to the electrical equipment art.

While, in the foregoing description, certain specific details and operative steps have been set forth together with certain suggested modifications, it will be obvious that additional variations may be made in these without departing from the spirit of the present invention.

The foregoing description has been given for clearness of understanding only, and no unnecessary limitations should be assumed therefrom.

What is claimed is:

1. An electrical switching device to sequentially open a normally closed circuit, to maintain said circuit open for a determinable time and to reclose said circuit, comprising, in combination, a fixed base, a first component assembly moveable with respect to said fixed base between a first position and second position, having a first contact point selectably registerable with third and fourth contact points on a second component assembly when said first component assembly is in said first position, said second component assembly being selectably moveable with respect to said fixed base between a first position and a second position, a second contact point registerable with a fifth contact point on said fixed base and resilient means operably connected between said fixed base and said first component assembly to absorb moving force applied to said first component assembly tending to cause overtravel of said first component assembly beyond said first and said second positions of said first component assembly.

2. An electrical switching device to sequentially open a normally closed circuit, to maintain said circuit open for a determinable time and to reclose said circuit, comprising, in combination, a fixed base, a first component assembly moveable with respect to said fixed base between a first position and a second position, having a first contact point selectably registerable with any one of a multiplicity of contact points on a second component assembly when said first component assembly is in said first position, said second component assembly being selectably moveable, with respect to said fixed base, to each of a multiplicity of positions each of which corresponds respectively to one of the multiplicity of contact points thereon, a second contact point registerable with a contact point on said fixed base and resilient means operably connected between said fixed base and said first component assembly to absorb moving force applied to said first component assembly tending to cause overtravel of said first component assembly beyond said first and said second positions of said first component assembly.

3. An electrical switching device to sequentially open a normally closed circuit, to maintain said circuit open for a determinable time and to reclose said circuit, comprising, in combination, a fixed base, a first component assembly pivotally moveable with respect to the fixed base through one of two selectable travel distances between a first position and a second position, a first contact point on said first component assembly, a second contact point on said first component assembly, a second component assembly pivotally moveable with respect to the fixed base between a first position and a second position, a third contact point on said second component assembly registerable with said first contact point when said second component assembly is in its first position, a fourth contact point on said second component assembly registerable with said first contact point when said second component assembly is in its second position, said third and fourth contact points being arranged on said second component assembly to effect two different travel distances for said first component assembly when said second component assembly is in its first and second positions, a fifth contact point on said fixed base registerable with said second contact point, first electrical circuitry connecting said first and said second contact points to a first common connecting point, second electrical circuitry connecting said third, fourth and fifth contact points to a second common connecting point, and resilient means operably connected between said fixed base and said first component assembly to absorb moving force applied to said first component assembly tending to cause overtravel of said first component assembly beyond said first and said second positions of said first component assembly.

4. An electrical switching device to sequentially open a normally closed circuit, to maintain said circuit open for a determinable time and to reclose said circuit, comprising, in combination, a fixed base, a first component assembly pivotally moveable with respect to the fixed base through one of a multiplicity of selectable travel distances between a first position and a second position, a first contact point on said first component assembly, a second contact point on said first component assembly, a second component assembly pivotally moveable with respect to the fixed base to each of a multiplicity of selectable positions, a multiplicity of contact points on said second component assembly each of which points is selectably registerable with said first contact point for a respective selectable position of said second component assembly, said multiplicity of contact points being arranged on said second component assembly to effect different selectable travel distances for said first component assembly when said second component assembly is pivotally moved with respect to the fixed base to each of said multiplicity of positions, a third contact point on said fixed base registerable with said second contact point, first electrical circuitry connecting said first and said second contact points to a first common connecting point, second electrical circuitry connecting each of said multiplicity of contact points on said second component assembly and said third contact point to a second common connecting point, and resilient means operably connected between said fixed base and said first component assembly to absorb moving force applied to said first component assembly tending to cause overtravel of said first component assembly beyond said first and said second positions of said first component assembly.

References Cited in the file of this patent

UNITED STATES PATENTS

| | | |
|---|---|---|
| 2,025,191 | Davis | Dec. 24, 1935 |
| 2,136,794 | Harjes | Nov. 15, 1938 |
| 2,803,715 | Guth | Aug. 20, 1957 |